June 26, 1951        R. E. TESSIER        2,558,281
MOTOR VEHICLE HEADLIGHT SYSTEM
Filed Jan. 13, 1948
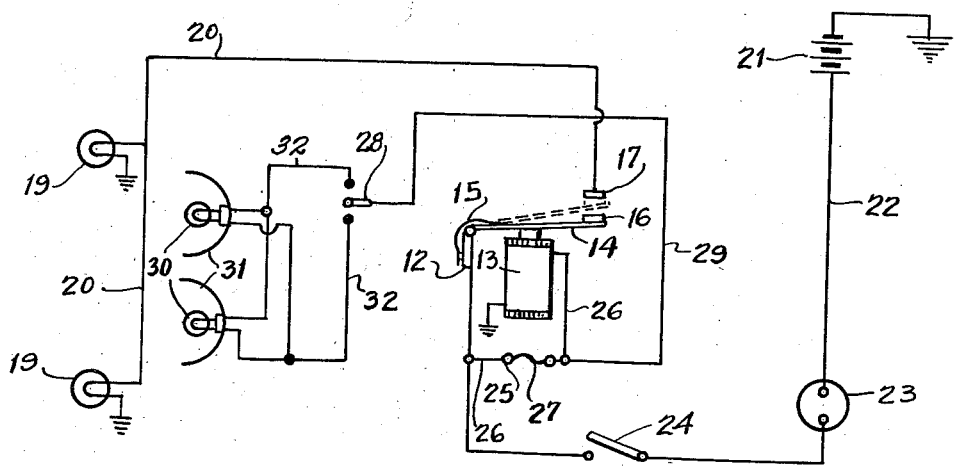
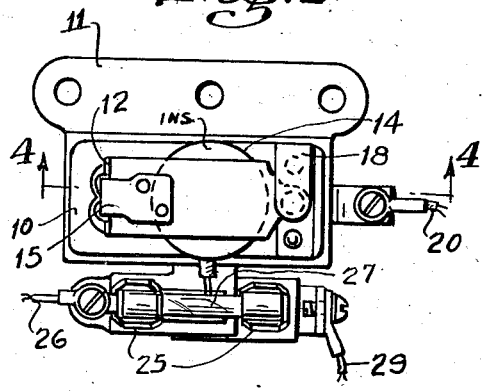
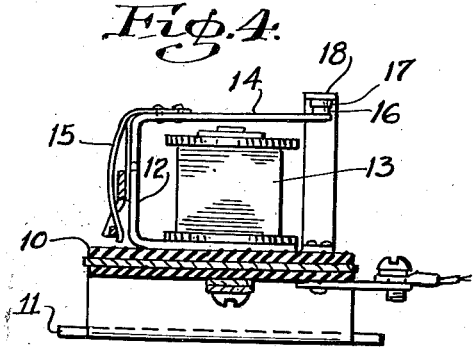
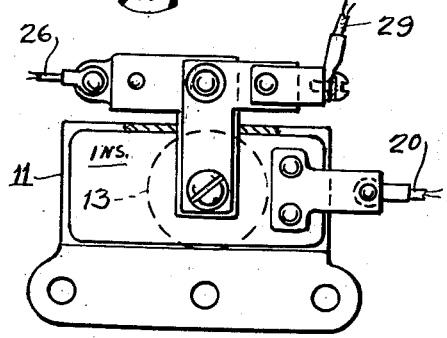
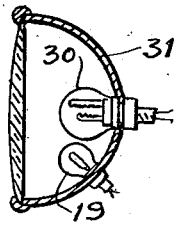
INVENTOR.
RICHARD E. TESSIER
BY
Martin P. Smith
ATTORNEY.

Patented June 26, 1951

2,558,281

UNITED STATES PATENT OFFICE 2,558,281

MOTOR VEHICLE HEADLIGHT SYSTEM

Richard E. Tessier, North Hollywood, Calif.

Application January 13, 1948, Serial No. 1,995

3 Claims. (Cl. 315—83)

My invention relates to the headlight systems of motor vehicles and has for its principal object, to provide simple, practical and effective means including auxiliary or secondary lights which may be readily combined with any conventional motor vehicle headlight system without materially altering same and which auxiliary means is wholly automatic in instantly effecting a flow of current through the auxiliary lamps in the event of a blowing out of the fuse in the main lighting system, or a short circuit in the latter, thus providing a safety factor of great value and importance while the equipped vehicle is being driven at night.

A further object of my invention is, to provide a vehicle headlight system of the character referred to, wherein all current load for the battery to the main lamps of the headlight passes through a single fuse so that when same burns or "blows" the current instantly by-passes to a circuit leading to the auxiliary lamps located in the headlight housings or on the fenders, bumper, or other vehicle parts.

With the foregoing and other objects in view, my invention consists in certain novel features of construction and arrangement of parts which will be hereinafter more fully described and claimed and illustrated in the accompanying drawing, in which:

Fig. 1 is a diagrammatic view showing my auxiliary lighting system combined with a motor vehicle headlight system.

Fig. 2 is a plan view of the automatic switch and fuse carrier used in my improved system.

Fig. 3 is a view looking against the underside of the switch and fuse carrier.

Fig. 4 is a vertical longitudinal section taken on the line 4—4 of Fig. 2.

Fig. 5 is a vertical section through the center of a headlight housing and showing one of the auxiliary lamps therein.

Referring by numerals to the accompanying drawing which illustrates a preferred embodiment of my invention, 10 designates a plate of insulation mounted on top of a bracket 11 and mounted on said plate is an L-shaped bracket 12.

A conventional magnet 13 is mounted on bracket 12 and an armature 14 disposed above said magnet is carried by one end of a spring 15, the other end being mounted on said bracket. This spring tends to lift armature 14 away from the core of magnet 13.

On top of the free end of armature 14 is a contact 16 which, when the fuse in main head lamp circuit is broken, engages a contact 17 carried by a post 18 mounted on bracket 11.

Leading from contact 17 to auxiliary lamps 19 is a conductor 20; leading from battery 21 to bracket 12 is a conductor 22, in which is located an ammeter 23 and a headlight switch 24 and leading from said conductor beyond switch 24 to one of a pair of fuse receiving clips 25 and from the other one of said clips to one end of magnet coil, is a conductor 26.

A conventional fuse 27 is seated in clips 25.

Leading from conductor 26, between fuse 27 and coil 13, to a foot dimmer switch 28, is a conductor 29, and leading from said dimmer switch to the main lamps 30 of the headlights 31 are conductors 32.

In Fig. 5, I have shown an auxiliary lamp 19 located in the lamp housing 31 with main lamp 30. However, the auxiliary lamp may be located at any desired points on the vehicle and when associated with special lenses, may function as fog piercing lights.

When switch 24 is closed, current from battery 21 flows through conductor 22, conductor 26 and fuse 27 to magnet 13 thereby attracting armature 14, thus holding contact 18 apart from contact 17 and current, also flows through conductor 29, dimmer switch 28 and conductors 30, to main lamps 30 in the headlight.

In the event that fuse 27 "blows" out, or if there is a short in the circuit including conductors 26, 29 and magnet 13, armature 14, under spring tension moves upward to establish contact between points 16 and 17, thus enabling current to flow from the battery through conductors 22 and 20 to the auxiliary lamps 19, thus instantly providing adequate headlights for the equipped vehicle.

Thus it will be seen that I have provided a motor vehicle headlight system that is simple in structure, inexpensive of manufacture, instantly automatic in action and very effective in performing the functions for which it is intended.

Minor changes in the size, form and construction of the various parts of my improved motor vehicle headlight may be made and substituted for those herein shown and described, without departing from the spirit of the invention, the scope of which is set forth in the appended claims.

I claim as my invention:

1. The combination with a motor vehicle headlight system including a source of electric current supply and an electromagnet, an armature for said magnet, a pair of head lamps, a conductor leading from said source of current supply to said head lamps, a fuse in said conductor, a branch conductor to said magnet at the head lamp side of said fuse, and a branch conductor leading to said armature at the other side of said fuse, of a pair of auxiliary head lamps, a contact adapted to be engaged by said armature when same leaves said magnet and a conductor leading from said contact to said auxiliary head lamps.

2. In a motor vehicle headlight system, the combination as set forth in claim 1, with yielding pressure means tending to disengage said armature from said magnet.

3. In a motor vehicle headlight system including a battery and headlights, a circuit from said battery to said headlights, an overload responsive circuit breaker in said circuit, an electromagnet connected to said circuit at the load side of said circuit breaker, a spring held armature for said magnet connected to the battery side of said circuit breaker, a contact carried by said armature, a stationary contact with which the contact on the armature is adapted to engage when said armature is released from said magnet, auxiliary headlights and a conductor from the stationary contact to said auxiliary headlights.

RICHARD E. TESSIER.

REFERENCES CITED

The following references are of record in the file of this patent:

UNITED STATES PATENTS

| Number | Name | Date |
| --- | --- | --- |
| 959,770 | MacDonald | May 31, 1910 |
| 1,815,294 | Gildner | July 21, 1931 |
| 1,925,200 | Miller | Sept. 5, 1933 |
| 2,381,169 | Jones | Aug. 7, 1945 |